(12) United States Patent
Tuli (10) Patent No.: US 7,289,244 B2
(45) Date of Patent: Oct. 30, 2007

(54) PORTABLE HIGH SPEED INTERNET ACCESS DEVICE

(76) Inventor: Raja Singh Tuli, 1155 Rene Levesque West, #3500, Montreal, Quebec (CA) H3B 3T6

( * ) Notice: Subject to any disclaimer, the term of this patent is extended or adjusted under 35 U.S.C. 154(b) by 98 days.

(21) Appl. No.: 09/879,972

(22) Filed: Jun. 14, 2001

(65) Prior Publication Data

US 2001/0028470 A1   Oct. 11, 2001

Related U.S. Application Data

(63) Continuation-in-part of application No. 09/496,172, filed on Feb. 20, 2000, now Pat. No. 7,068,381.

(51) Int. Cl.
*B41B 1/00* (2006.01)
*G06K 15/00* (2006.01)

(52) U.S. Cl. .................. 358/1.9; 358/1.6; 358/1.15

(58) Field of Classification Search ................ 709/203, 709/217, 200, 228, 223; 707/10; 455/414.1; 345/109; 358/1.6, 1.9, 1.15
See application file for complete search history.

(56) References Cited

U.S. PATENT DOCUMENTS

| | | |
|---|---|---|
| 4,899,394 A | 2/1990 | Lee |
| 5,161,213 A | 11/1992 | Knowlton |
| 5,355,447 A | 10/1994 | Knowlton |
| 5,444,763 A | 8/1995 | Lazaridis et al. |
| 5,534,893 A | 7/1996 | Hansen, Jr. et al. |
| 5,546,524 A | 8/1996 | Chow et al. |
| 5,555,241 A | 9/1996 | Lazaridis et al. |
| 5,559,800 A | 9/1996 | Mousseau et al. |
| 5,600,790 A | 2/1997 | Barnstijn et al. |
| 5,657,345 A | 8/1997 | Lazaridis |
| 5,682,525 A | 10/1997 | Bouve et al. |

(Continued)

FOREIGN PATENT DOCUMENTS

EP          0 889 402 A          1/1999

(Continued)

OTHER PUBLICATIONS

International Search Report, PCT/US 01/03382, 1 pages, 2001.

(Continued)

*Primary Examiner*—Thomas D. Lee
(74) *Attorney, Agent, or Firm*—Blakely, Sokoloff, Taylor & Zafman LLP (57) ABSTRACT

The invention discloses a portable device providing access to the Internet. A host computer runs a browser taking information received from the Internet, renders it onto a virtual display in memory, captures a portion of the image, reduces the color depth, compresses and sends it to the device. A PDA browser software program runs on the device containing its own window. The portion of the image sent from the host computer is equal to or proportional to the size of the PDA browser window. Upon scrolling on the device, the image of the new location is sent to the device, stored in memory, and displayed for view. Web pages and corresponding areas frequently viewed by the user are stored on the host computer, whereby the host computer recognizes these web pages and automatically sends corresponding areas frequently viewed to be displayed.

102 Claims, 4 Drawing Sheets

U.S. PATENT DOCUMENTS

| | | |
|---|---|---|
| 5,699,255 A | 12/1997 | Ellis et al. |
| 5,701,451 A | 12/1997 | Rogers et al. |
| 5,721,908 A | 2/1998 | Lagarde et al. |
| 5,727,159 A | 3/1998 | Kikinis |
| 5,758,110 A | 5/1998 | Boss et al. |
| 5,761,663 A | 6/1998 | Lagarde et al. |
| 5,764,235 A | 6/1998 | Hunt et al. |
| 5,765,176 A | 6/1998 | Bloomberg |
| 5,793,964 A | 8/1998 | Rogers et al. |
| 5,802,312 A | 9/1998 | Lazaridis et al. |
| 5,809,415 A | 9/1998 | Rossmann |
| 5,810,680 A | 9/1998 | Lobb et al. |
| 5,831,679 A | 11/1998 | Montgomery et al. |
| 5,838,906 A | 11/1998 | Doyle et al. |
| 5,856,827 A | 1/1999 | Sudo |
| 5,862,348 A | 1/1999 | Pedersen |
| 5,867,662 A | 2/1999 | Riggs |
| 5,884,014 A | 3/1999 | Huttenlocher et al. |
| 5,884,056 A | 3/1999 | Steele |
| 5,893,095 A | 4/1999 | Jain et al. |
| 5,910,805 A | 6/1999 | Hickey et al. |
| 5,915,250 A | 6/1999 | Jain et al. |
| 5,923,736 A | 7/1999 | Shachar |
| 5,925,103 A | 7/1999 | Magallanes et al. |
| 5,928,324 A | 7/1999 | Sloan |
| 5,938,737 A | 8/1999 | Smallcomb et al. |
| 5,949,412 A | 9/1999 | Huntsman |
| 5,949,875 A | 9/1999 | Walker et al. |
| 5,956,716 A | 9/1999 | Kenner et al. |
| 5,961,586 A | 10/1999 | Pedersen |
| 5,961,603 A | 10/1999 | Kunkel et al. |
| 5,966,135 A | 10/1999 | Roy et al. |
| 5,974,441 A | 10/1999 | Rogers et al. |
| 5,978,835 A | 11/1999 | Ludwig et al. |
| 5,987,256 A | 11/1999 | Wu et al. |
| 5,995,102 A | 11/1999 | Rosen et al. |
| 5,995,105 A | 11/1999 | Reber et al. |
| 6,003,065 A | 12/1999 | Yan et al. |
| 6,006,105 A | 12/1999 | Rostoker et al. |
| 6,006,231 A | 12/1999 | Popa |
| 6,006,241 A | 12/1999 | Purnaveja et al. |
| 6,008,836 A | 12/1999 | Bruck et al. |
| 6,011,546 A | 1/2000 | Bertram |
| 6,011,905 A | 1/2000 | Huttenlocher et al. |
| 6,012,083 A | 1/2000 | Savitzky et al. |
| 6,012,086 A | 1/2000 | Lowell |
| 6,014,133 A * | 1/2000 | Yamakado et al. ......... 345/501 |
| 6,014,694 A | 1/2000 | Aharoni et al. |
| 6,014,706 A | 1/2000 | Cannon et al. |
| 6,016,535 A | 1/2000 | Krantz et al. |
| 6,021,409 A | 2/2000 | Burrows |
| 6,023,749 A | 2/2000 | Richardson |
| 6,026,435 A | 2/2000 | Enomoto et al. |
| 6,034,686 A | 3/2000 | Lamb et al. |
| 6,035,281 A | 3/2000 | Crosskey et al. |
| 6,047,047 A | 4/2000 | Aldridge et al. |
| 6,049,539 A | 4/2000 | Lee et al. |
| 6,049,821 A | 4/2000 | Theriault et al. |
| 6,049,831 A | 4/2000 | Gardell et al. |
| 6,052,130 A | 4/2000 | Bardon et al. |
| 6,054,985 A | 4/2000 | Morgan et al. |
| 6,057,857 A | 5/2000 | Bloomfield |
| 6,065,057 A | 5/2000 | Rosen et al. |
| 6,065,800 A | 5/2000 | Olson |
| 6,067,571 A | 5/2000 | Igarashi et al. |
| 6,072,483 A | 6/2000 | Rosin et al. |
| 6,073,168 A | 6/2000 | Mighdoll et al. |
| 6,073,483 A | 6/2000 | Nitecki et al. |
| 6,081,623 A | 6/2000 | Bloomfield et al. |
| 6,084,584 A | 7/2000 | Nahi et al. |
| 6,087,952 A | 7/2000 | Prabhakaran |
| 6,092,107 A | 7/2000 | Eleftheriadis et al. |
| 6,097,352 A | 8/2000 | Zavracky et al. |
| 6,101,180 A | 8/2000 | Donahue et al. |
| 6,104,392 A | 8/2000 | Shaw et al. |
| 6,105,021 A | 8/2000 | Berstis |
| 6,108,655 A | 8/2000 | Schleimer et al. |
| 6,108,727 A | 8/2000 | Boals et al. |
| 6,118,449 A | 9/2000 | Rosen et al. |
| 6,118,899 A | 9/2000 | Bloomfield et al. |
| 6,119,135 A | 9/2000 | Helfman |
| 6,121,970 A | 9/2000 | Guedalia |
| 6,138,156 A | 10/2000 | Fletcher et al. |
| 6,157,935 A | 12/2000 | Tran et al. |
| 6,182,054 B1 | 1/2001 | Dickinson et al. |
| 6,182,127 B1 | 1/2001 | Cronin, III et al. |
| 6,185,625 B1 | 2/2001 | Tso et al. |
| 6,192,393 B1 | 2/2001 | Tarantino et al. |
| 6,195,667 B1 | 2/2001 | Duga et al. |
| 6,219,465 B1 | 4/2001 | Nacman et al. |
| 6,226,400 B1 | 5/2001 | Doll |
| 6,256,750 B1 | 7/2001 | Takeda |
| 6,262,732 B1 | 7/2001 | Coleman et al. |
| 6,263,347 B1 | 7/2001 | Kobayashi et al. |
| 6,286,003 B1 | 9/2001 | Muta |
| 6,295,059 B1 | 9/2001 | Lentz et al. |
| 6,298,162 B1 | 10/2001 | Sutha et al. |
| 6,304,928 B1 | 10/2001 | Mairs et al. |
| 6,313,880 B1 | 11/2001 | Smyers et al. |
| 6,317,781 B1 | 11/2001 | De Boor et al. |
| 6,345,279 B1 | 2/2002 | Li et al. |
| 6,356,283 B1 * | 3/2002 | Guedalia ................. 345/760 |
| 6,359,603 B1 | 3/2002 | Zwern |
| 6,404,416 B1 | 6/2002 | Kahn et al. |
| 6,411,275 B1 | 6/2002 | Hedberg |
| 6,433,801 B1 | 8/2002 | Moon et al. |
| 6,449,639 B1 | 9/2002 | Blumberg |
| 6,466,198 B1 | 10/2002 | Feinstein |
| 6,477,143 B1 | 11/2002 | Ginossar |
| 6,480,710 B1 | 11/2002 | Laybourn et al. |
| 6,535,743 B1 | 3/2003 | Kennedy, III et al. |
| 6,536,043 B1 | 3/2003 | Guedalia |
| 6,539,077 B1 | 3/2003 | Ranalli et al. |
| 6,564,250 B1 | 5/2003 | Nguyen |
| 6,571,245 B2 | 5/2003 | Huang et al. |
| 6,598,087 B1 | 7/2003 | Dixon, III et al. |
| 6,704,024 B2 * | 3/2004 | Robotham et al. ......... 345/581 |
| 2001/0034770 A1 | 10/2001 | O'Brien |
| 2002/0015042 A1 | 2/2002 | Robotham |

FOREIGN PATENT DOCUMENTS

| | | |
|---|---|---|
| EP | 0 889 636 A | 1/1999 |
| EP | 890922 A2 | 1/1999 |
| EP | 1 001 613 A | 5/2000 |
| EP | 1043876 A2 | 10/2000 |
| WO | WO97 30556 A | 8/1997 |
| WO | WO97 38389 A | 10/1997 |
| WO | WO98 40842 A | 9/1998 |
| WO | WO98 43177 A | 10/1998 |
| WO | WO99 09658 A | 2/1999 |
| WO | WO 0033232 A2 | 6/2000 |
| WO | WO 01 09836 A | 2/2001 |

OTHER PUBLICATIONS

International Search Report, PCT/CA 01/00114, 3 pages, 2001.
International Search Report, PCT/CA 01/00126, 3 pages, 2001.
International Search Report, PCT/CA 01/00170, 4 pages, 2002.
International Search Report, PCT/CA 01/00169, 3 pages, 2002.
International Search Report, PCT/CA 02/00048, 5 pages, 2003.
Tagawa Norio, "Data Relay System and Data Repeater Applied to the System", Patent Abstracts of Japan, vol. 1997, No. 10, Jun. 24, 1997.

Armando Fox et al, "Experience with Top Gun Wingman: a proxy-based graphical web browser fro the 3Com PalmPilot", *Middleware*, IFIP International Conference on Distributed Systems, Platforms and Open Distributed Processing, Sep. 1998, pp. 407-424.

Richard Han, et al., "Dynamic Adaptation in an Image Transcoding Proxy for Mobile Web Browsing", *IEEE Personal Communication*, Dec. 1998, pp. 8-17.

Timothy Bickmore, et al., "Web Page Filtering and Re-Authoring for Mobile Users", *The Computer Journal*, vol. 42, No. 6, 1999.

Tristan Richardson, Quentin Stafford-Fraser, Kenneth R. Wood & Andy Hopper, "Virtual Network Computing", *IEEE Internet Computing*, vol. 2 No. 1, Jan./Feb. 1998 pp. 33-38.

Citrix Systems, Inc.: "Citrix Announces New Product and Product Enhancements that Speed Web Application", http://www.citrix.com/press/news/releases/20000905_product_enhance.asp, Sep. 5, 2000.

Boutell, T. et al., "PNG (Portable Network Graphics) Specification Version 1.0", RFC 2083, pp. 1-102, Mar. 1997.

Halfhill, T.R., "Good-Bye GUI . . . Hello, NUI," BYTE Magazine, www.byte.com, vol. 22, No. 7, pp. 60-64, 66, 68, 70, and 72, Jul. 1997.

Masinter, L., "Returning Values from Forms: multipart/form-data," RFC 2388, pp. 1-9, Aug. 1998.

Jao, C.S. et al., "The display of photographic-quality images on the Web: a comparison of two technologies," IEEE Transactions on Information Technology In Biomediciene, vol. 3, iss. 1, pp. 70-73, Mar. 1999.

Kaljuvee, O. et al., "Efficient Web form entry on PDAs," ACM Proceedings of the tenth International Conference on WWW, ACM Press, ISBN: 1-58113-348-0, pp. 663-672, May 2001.

Selected pages from AT&T Wireless, Bell Atlantic Mobile, and Nextel, as delivered through the Wayback Machine, web.archieve.org.

Lewis, Ted. "Information Appliances: Gadget Netopia" *Computer*, vol. 31, issue 1, Jan. 1998, pp. 59-68.

Cimini, Leonard J., Jr., et al. "Advanced Cellular Internet Service (ACIS)", *IEEE communication Magazine*, vol. 36, Issue 10, Oct. 1998, pp. 150-159.

Oliphant, Malcolm W. "The Mobile Phone Meets the Internet", *IEEE Spectrum*, vol. 36, Issue 8, Aug. 1999, pp. 20-28.

Lind, R., et al. "The Network Vehicle—A Glimpse into the Future of Mobile Multi-Media", *IEEE ASE Systems Magazine*, Sep. 1999, pp. 27-32.

Gbaguidi, Constant, et al. "A programmable Architecture for the Provision of Hybrid Services", *IEEE communications Magazine*, vol. 27, Issue 7, Jul. 1999, pp. 110-116.

Narayanaswamy, Shankar, et al. "User Interface for a PCS Smart Phone", *IEEE Int.. Conference on Multimedia Computing and Systems*, vol. 1 Jun. 1999, pp. 777-781.

Rumba Technical Bulletin, "Configuring RUMBA LPR & LPD (16-bit)," 1996, from the web: 156.27.8.200/ts_rumba/solution/pdf/TCPIP/4002.pdf, pp. 1-11.

International Search Report, PCT/CA 02/00133, 3 pages, 2003.

International Search Report, PCT/CA 02/00048, 3 pages, 2003.

\* cited by examiner

PORTABLE HIGH SPEED INTERNET ACCESS DEVICE

This application is a continuation in part of application Ser No. 09/496,172 filed on Feb. 2, 2000 now U.S. Pat. No. 7,068,381.

PRIOR ART

The background of the present invention includes U.S. Pat. No. 5,925,103, Internet Access Device, which describes an improved Internet access system, vastly different from the present invention. Other prior art would include palm top computers and hand-held computers that have limited processing power due to design restrictions. Thus, these computers are much slower for accessing the Internet and World Wide Web.

BACKGROUND OF THE INVENTION

The present invention provides a remote Internet access device with rapid scrolling features of a web page on the device, which is an important aspect of the Internet experience. The result is an Internet access solution with rapid scrolling that occurs locally on the device. A PDA browser software program runs on the device, which has its own window and by scrolling inside this window, the host computer scrolls to the same location and sends only the portion of the image within the PDA browser window to the remote device, which is equal to or proportional to the size of the remote device's display screen.

SUMMARY

It is an object of the present invention to disclose a portable device that can access the Internet and World Wide Web, at extremely low costs. It is another object of the present invention to provide fast access to parts of a web page received from the Internet, that are stored on the remote device for viewing at any time.

The present invention discloses a portable device that connects to a cellular telephone. Thus, the device has a wireless connection to the Internet. A host computer that runs a browser takes information received from the Internet and renders it onto a virtual display in its memory, but only the portion of the image of the web page is captured, reduced in color depth to a lower depth color image, then compressed and sent to the portable device of the invention, for displaying to the user. Hence, the portable device receives a compressed image, decompresses it, stores it into memory, and displays it for view. Thus, the user views a bit map image of a portion of the web page.

The portable device contains a PDA browser software which runs on the device containing its own window, and by scrolling inside this window, messages are sent to the host computer which scrolls to the same location. The CPU present in the portable device performs all scrolling functions locally on the device. Icons or buttons in the PDA browser window are mapped to similar icons or buttons in the host computer, such that by clicking on an icon or button in the PDA browser window sends a message to the host computer to click down on the same icon or button in the host computer. Clicking in an area of the PDA browser window sends a message to the host computer to provide a click down in the same location of the web page, whereby a new web page is loaded, and the portion of the image that appears in the PDA browser window is reduced in color depth, compressed and sent to the portable device.

DETAILED DESCRIPTION OF THE DRAWINGS

The invention is described in more detail below with respect to an illustrative embodiment shown in the accompanying drawings in which.

DETAILED DESCRIPTION OF THE PRESENT INVENTION

To facilitate description, any numeral identifying an element in one figure will represent the same element in any other figure.

The principal embodiment of the present invention aims to provide a portable device that allows a user to access the Internet or the World Wide Web (WWW), which is a device similar to a portable computer. It is another aim of the present invention, to provide a method to develop a cost competitive device. It is a further aim of the present invention to provide a means for rapidly scrolling around an image displayed on the portable device.

Currently, existing portable devices such as the Palm Pilot VII and Windows CE type devices contain an operating system, and within the operating system a mini-browser to interpret information received from the WWW or Internet and then display this information on the screen. This requires a powerful microprocessor. Such existing portable devices do not provide rapid scrolling within an opened application program, as each scroll command is sent to the host computer and a refreshed image is sent back to the portable device. This process is slow and tedious unlike the scrolling method performed directly on the portable device of the present invention.

Figure 1:
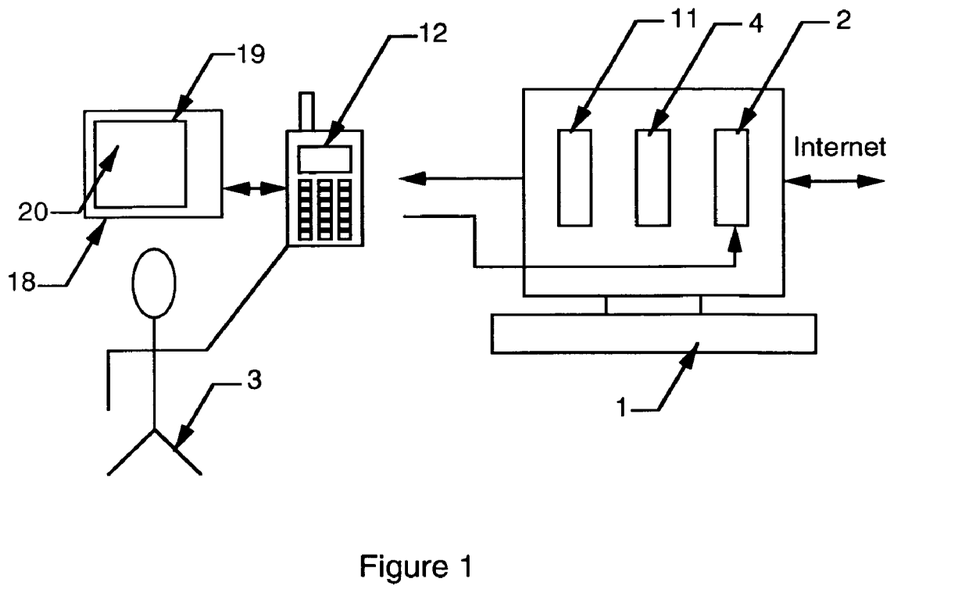
FIG. 1 illustrates elements in the host computer, which communicates with a remote user and the portable device of the invention.
Figure 6:
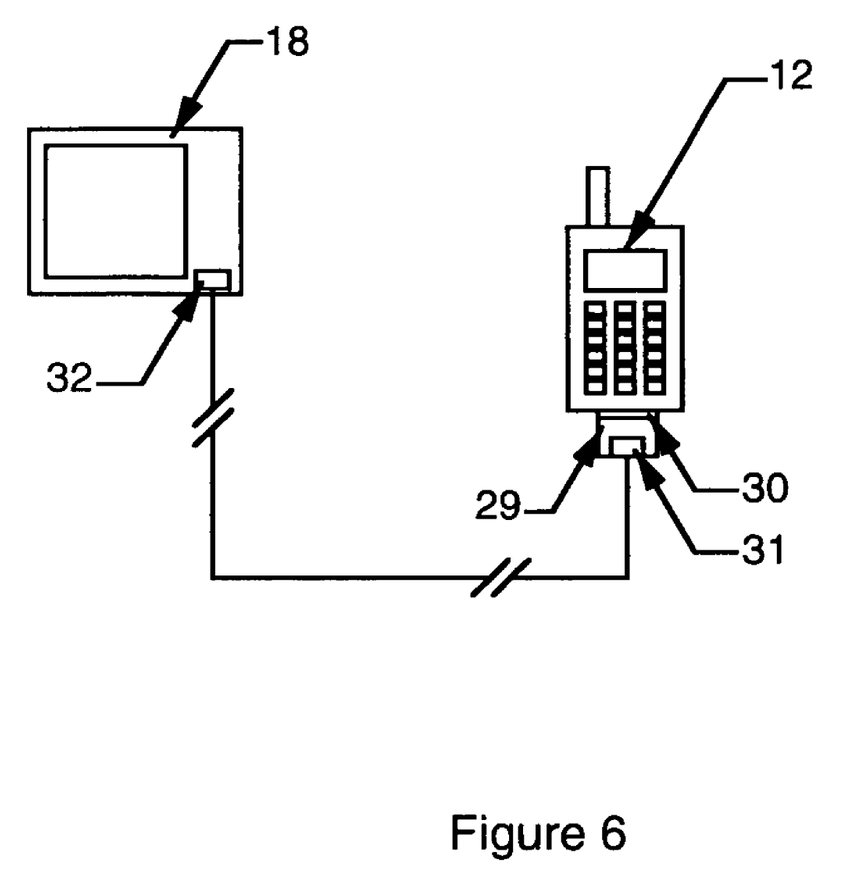
FIG. 6 illustrates the wireless connection between the remote device and a cellular phone.

The principal embodiment of the present invention is disclosed in FIG. 1. A host computer 1 is depicted which is connected to the Internet, and that host computer receives information from outside in the form of HTML or JAVA or other formats, required to generate a web page. Running in the host computer, is a browser program 2 that receives all its information from outside and renders it onto a virtual display in its memory, hence a bitmap is made out of it. When a remote user 3 requests to view a Web page (or electronic message, etc.) the host computer 1 receives HTML, JAVA, or other types of information from a web server outside the computer (as information may be gathered from a variety of different sources) and the browser program 2 takes all information received from outside and renders it onto a virtual display in its memory. What is therefore rendered in the memory is a web page, and a portion of this information is captured by the browser 2 and directed to another software 4, which reduces the color depth of the information (i.e. the entire image comprising graphics and text) which is usually received in 24 bit color, subsequently reduced to a black and white bit map or raster image. Even though text may appear in black and white, the entire image may be 24 bit color which is reduced to black and white. This reduced portion of the web page is then compressed entirely using a loss-less method of compression by software 11, implementing G3 or G4 methods in the preferred embodiment. This compressed image is sent through a port in the host computer 1, in the preferred embodiment, to the cellular telephone 12 of FIG. 1, which is connected to the portable high speed internet access device 18 of the invention. The connection between the device and the cellular phone may be hard wired as provided by a data cable. However, in the preferred embodiment the connection between the device and the cellular phone may be wireless. With further reference to FIG. 6, a module 29 is connected to the data connection port 30 on the cellular phone 12. This module 29 contains a wireless transceiver 31 and related microelectronics, which uses its own protocol to transmit data to the device 18 and also receive data from the device. All error correction, encryption and protocol related issues are handled within the module 29 for sending and receiving data at the cellular phone. The device 18 also contains a similar transceiver 32 and related microelectronics, to enable wireless communication and data transfer between the device and cellular phone. The portable device 18, which contains a display screen 20 with a transparent touch panel and related microelectronics, receives the compressed image, decompresses the image, stores it into internal memory, and displays it for viewing to the user 3.

In another embodiment, the cellular phone 12 of FIG. 1 can be replaced by a wire less modem which is connected to the portable high speed internet access device 18 of the invention. This enables the portable device 18 to receive the compressed image, decompresses the image, store it into internal memory, and display it for viewing by the user 3.

In another embodiment, the cellular phone 12 of FIG. 1 can be replaced by a LAND line or PSTN which is connected to the portable high speed internet access device 18 of the invention. This enables the portable device 18 to receive the compressed image, decompresses the image, store it into internal memory, and display it for viewing by the user 3.

Figure 2:
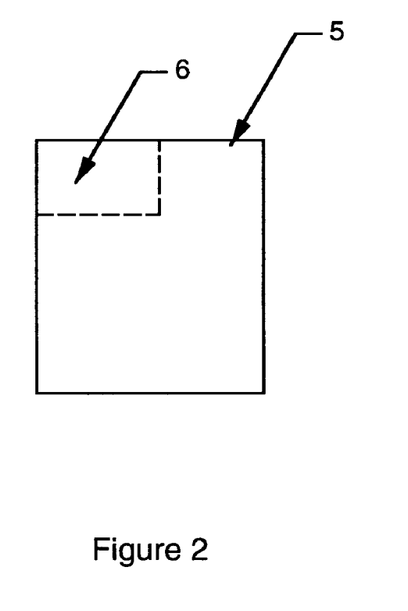
FIG. 2 illustrates the entire web page image compared with the displayable area sent to the remote device for view by a user.
Figure 4:
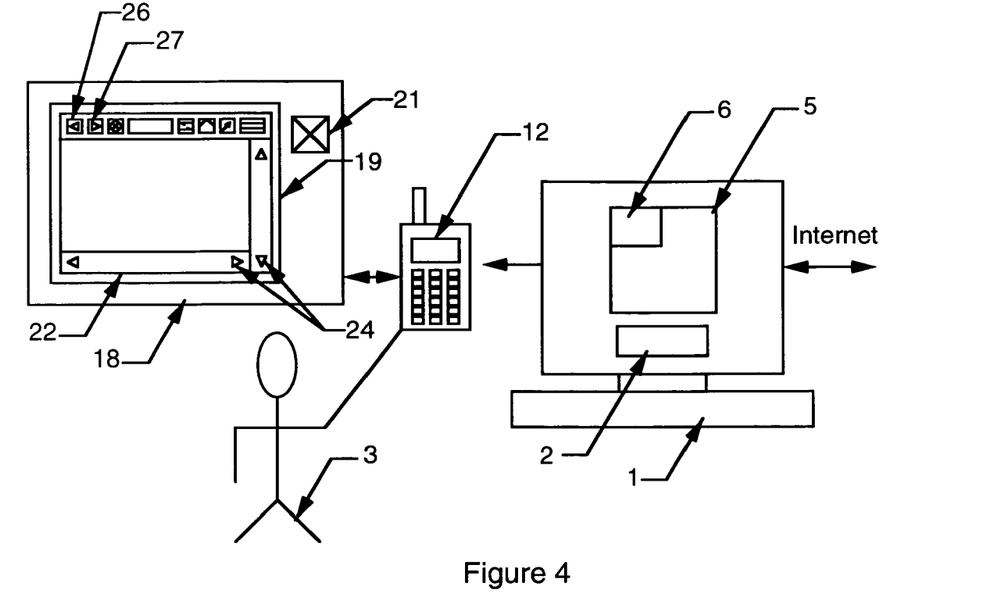
FIG. 4 illustrates the PDA browser software and PDA browser window.

In a further embodiment of the present invention, the image 5, as shown in FIG. 2, contains the information that would normally be displayed on a single Web page. As can be seen, the image 5 of the web page that is rendered by the browser 2 onto a virtual display in its memory is usually larger than the portion 6 of the web page sent to the device. Thus, only a portion of the image of the web page 5 is sent from the host computer 1 to the portable device 18 (FIG. 1), to be displayed for view by a user. With further reference to FIG. 4, an application program 21 is installed and runs on the portable device 18. This application program 21 is referred to as the PDA browser software, which has its own PDA browser software window 22. The PDA browser software window 22 is adjustable in size and may be set to be larger or smaller than the size of the display window 19 of the device, but ideally it is set to be the same size as the display window 19. In particular, what the PDA browser software application program 21 facilitates is scrolling which is performed locally on the portable device 18, after a portion of the web page image 5 is sent to the portable device. The PDA browser software application program 21, runs locally on the portable device 18 whose window 22 is also implemented locally on the portable device. The scrolling of the web page is done on the device facilitated by the browser scroll bars 24 or other methods of scrolling. Upon initiating a scrolling command on the remote device 18, a message is sent from the remote device to the host computer 1 informing of the new location the PDA browser window 22 has scrolled to, so that the host computer may also scroll to that precise location, though there may be a lag or time difference between the scrolling on the remote device and scrolling on the host computer. Since the scroll commands are sent first to the host computer, any click commands initiated by the user 3 after scrolling would be sent after the scroll commands, subsequently entered on the host computer 1. Icons or buttons in the PDA browser window 22 are mapped to similar icons or buttons providing web functions in the host computer 1, such that is by clicking on an icon or button in the PDA browser window sends a message to the host computer to click down on the same icon or button in the host computer. Hence the host computer 1 mirrors the PDA browser window 22. The display window 19 contains a portion at the top, which has such buttons or icons providing web functions, and these are fixed with respect to the display window. Similarly, clicking in an area of the PDA browser window 22 sends a message to the host computer to provide a click down in the same location of the web page.

In the preferred embodiment of the invention and with further reference to FIG. 4, the entire web page 5 which is much larger than the portable device's window 19, is rendered onto a virtual display in memory by the browser 2 in the host computer 1. A portion 6 of the image of the web page 5 is sent from the host computer 1 to the device 18, which is equal to or proportional to the size of the browser window 22 in the device. This portion of the image is captured, the color depth reduced, and the image digitally compressed and sent to the portable device 18. The portable device receives this portion of the image, decompresses it, stores it into memory and displays it to the user. Hence, with further reference to FIG. 3, the remote device 18 would first receive a portion 7 of the web page image 5 which is then decompressed and displayed on the display screen 20 after it is stored into a display memory, or as it is being stored into a display memory on the remote device. Thus the device shows the web page image from the display memory location. The entire web page 5 has memory allocated for it on the remote device and whenever the remote device gets different parts of the image, it digitally decompresses that part of the image and stores it in the correct location in the display memory on the device. The user also has the ability to scroll around on the device regardless of what portions of the web page image were received and stored in the display memory. If the user 3 only received segment 7 and the connection to the cellular telephone 12 was terminated, then the user may still scroll to other parts of the image, but only portions of segment 7 will appear in the display screen 20 if these portions are in the area where the browser window 22 has scrolled to. No other areas would be displayed since only segment 7 was received, and other areas would appear white and can only be displayed if the connection to the cellular phone is resumed, for the host computer to send portions of the web page where the browser window 22 has scrolled to.

Figure 3:
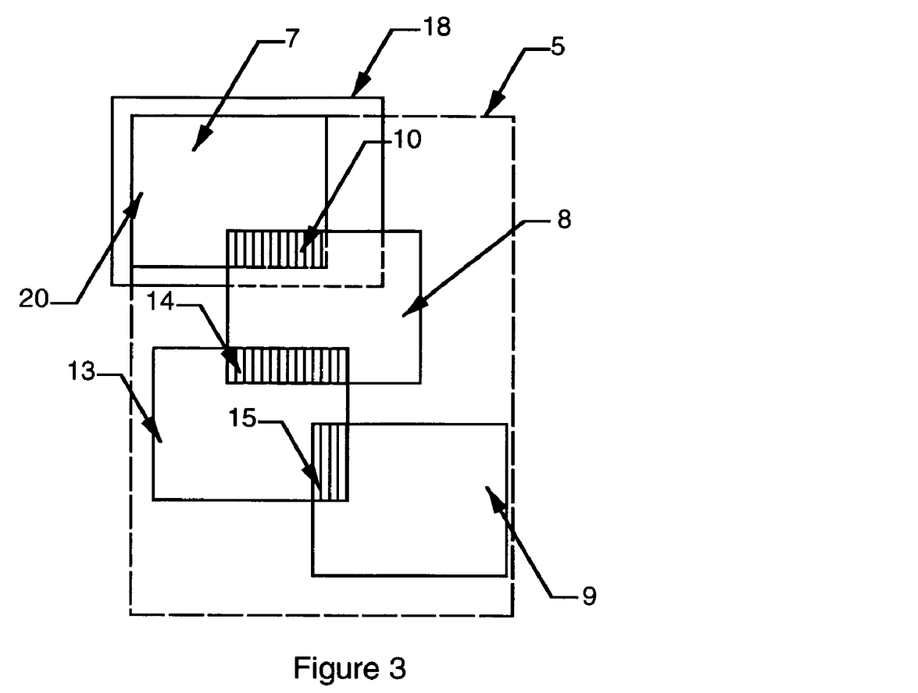
FIG. 3 illustrates portions of the web page image that are sent to the remote device in accordance with the present invention.
Figure 3A:
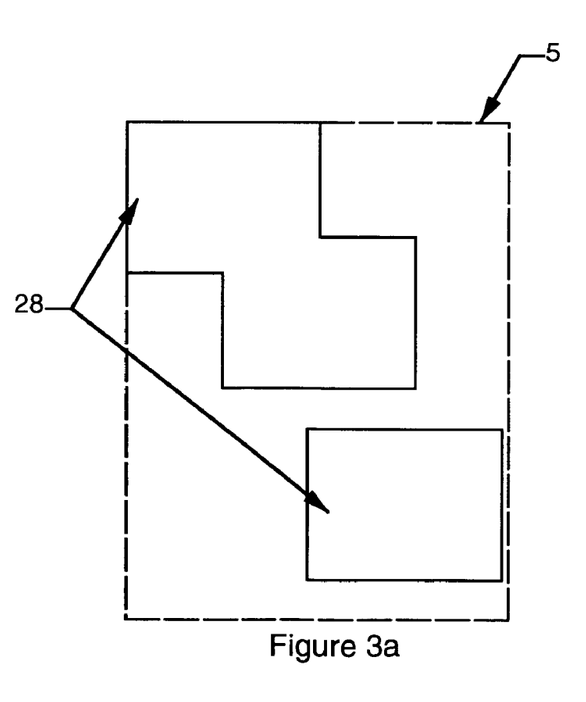
FIG. 3a illustrates portions of the web page image that are stored in memory on the remote device in accordance with the present invention.
Figure 5:
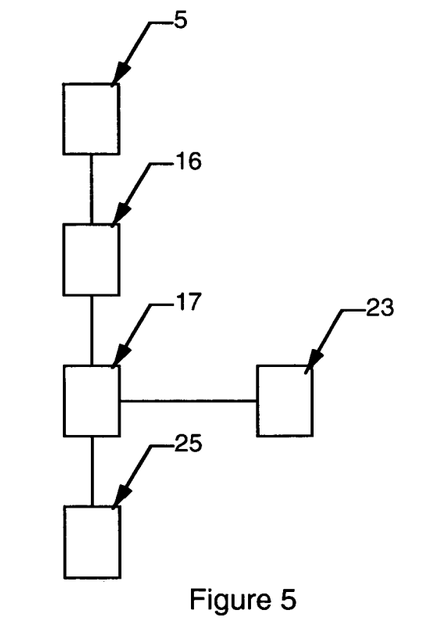
FIG. 5 illustrates a tree of web pages viewed showing the sequence, which is stored in the host computer.

When the cellular phone connection is active, and the user 3 scrolls to another part of the image of the web page which may involve horizontal and or vertical scrolling, the exact scrolling commands are transmitted from the remote device 18 to the host computer 1, so that the host computer knows exactly where the user has scrolled to and the part of the web page 5 that would appear in the browser window 22 of the device 18 is captured, the color depth reduced, and the image compressed and sent to the portable device 18. The portable device receives this portion of the image, decompresses it, stores it in the correct location in the display memory and displays it for view to the user as web page segment 8 (FIG. 3). Portions 10 that are common to both web page segments 7 and 8 are not sent again with segment 8, as this is already there in the display memory on the portable device 18. Thus, portion 10 is immediately displayed first on the screen then the remainder of segment 8 is sent by the host computer, and displayed shortly afterwards on the screen of the device. Sending only the portion of the image that appears in the browser window 22 to the remote device also reduces the bandwidth considerably, and conserves on memory in the portable device, compared to sending the entire web page to be stored on the device. The user 3 may scroll again to other areas of the web page 5 and only the portion of the web page that would appear in the browser window 22 of the device 18 is captured, the color depth reduced, and the image compressed and sent to the portable device 18, which stores it in the correct location in the display memory and displays it to the user as web page segment 9. Hence, only the areas scrolled to are sent to the remote device 18, since the user at the remote device only gets the data of where scrolled to, and these areas would be stored in the exact location in the display memory on the device as they appear on the web page in the host computer. Thus, segments 7, 8 & 9 are put in their correct location in the display memory as they appear on the web page 5 such that when the user scrolls around, parts of the image containing segments 7, 8 & 9 are visible in their correct location, even if the connection to the cellular phone is terminated. In this particular example, the display memory on the portable device 18 for web page 5 would be expanded to contain segments 7, 8, and 9 since these are the only areas scrolled to by the user, and these segments comprise the entire web page image that would be stored into memory on the device 18 for the web page 5 received by the host computer 1. Hence, area 28 of FIG. 3*a* represents the portion of web page 5 that is actually stored in memory on the device for this particular web page, as these are the only areas scrolled to. The host computer also keeps a record of which segments were sent to the device 18 in its memory for each web page viewed, in the event the user 3 returns to a previously viewed web page, the host computer would know exactly which segments were sent and stored in memory on the device 18, and these segments would not be sent again. This means that the device also compresses and stores into memory previously viewed web pages and any information on links to all viewed web pages on the device. Thus, if the user is viewing a particular web page on the device and clicks on a link to go to another web page, that particular web page is compressed and stored into memory with link information to the previously viewed web page, in case the user wants to return to it. Therefore, the device moves the current web page from the display memory and clears this display memory, compresses and stores this web page in a different memory location with link information, and allows portions of the new web page to be stored in the display memory for view by the user. A tree is created of links between all web pages viewed on the remote device as further illustrated in FIG. 5. This tree illustrates the sequence of web pages viewed with web pages represented by numerals 5, 16, 17, 23 and 25, and this information is stored in the device 18, so that the user 3 may view previously seen web pages by clicking on the back icon 26 and forward icon 27, (FIG. 4). Thus, if the user 3 is viewing web page 23 and clicks on the back icon 26, web page 17 will be retrieved from memory, digitally expanded or decompressed and placed in the display memory to be viewed on the device 18 by the user, and the user will be able to scroll around this image. The previously viewed web page 23 would be removed from the display memory, compressed, and stored in another memory location on the device prior to retrieving and displaying web page 17. The device would store numerous saved web pages viewed and the tree of links between all web pages viewed on the remote device in its memory. If the user is viewing a particular web page 16 and returns to a previously viewed web page 5 (FIG. 5) by clicking on the back icon 26 (FIG. 4), the last area the user was viewing on web page 5 is the first area that shows up on the display screen 20. Hence, when a web page is saved in memory on the device 18 the last scrolled or viewed location is also saved in that memory. User preferences are also stored on the host computer. In particular, the web pages that the user frequently visits (favorite web pages) and the locations on those particular web pages that the user frequently visits (favorite locations), are all stored on the host computer automatically, based on the user's prior usage pattern. Thus, when the user types in the address of a favorite web page on the remote device, for example web page 5 of FIG. 3, a message is sent to the host computer informing of the web page address, and the host computer automatically recognizes that the user has frequently visited this web page previously and does not only send portion 7 of the web page. Portions 8, 9 and 13 are also sent to the remote device based on previous usage patterns as these are areas frequently scrolled to for this particular web page, and all these portions are sent in anticipation of the user scrolling to such favorite locations. This information is stored on the host computer for each such favorite web page.

If the user scrolls to segment 13 (FIG. 3) after first scrolling to segments 7, 8 & 9, areas 14 and 15 common to segments 8, 9 and 13 are immediately displayed first on the screen 20 as they exist in the display memory on the device 18, then the remainder of segment 13 (not including areas 14 and 15) is sent by the host computer, stored in the display memory in its correct location, and displayed shortly afterwards on the screen 20 of the device. Thus, the display memory on the portable device 18 for web page 5 would be expanded to contain only segments 7, 8, 9 and 13 as a page, with no information stored on other parts of the web page that are not scrolled to. Each web page viewed is stored on the device 18 and also the host computer 1, and a tree is created of links between all web pages viewed as further illustrated in FIG. 5. This tree illustrates the sequence of web pages viewed with web pages represented by numerals 5, 16, 17, 23 and 25, and this information containing links to all web pages is also stored in the host computer 1, so that the user 3 may view previously seen web pages by clicking on the back icon 26 and forward icon 27, (FIG. 4). Thus, if the user 3 is viewing web page 23 and clicks on the back icon 26, web page 17 will be displayed on the device 18. Clicking on the forward icon 27 displays web page 23 again to the user.

In another embodiment of the present invention, the entire web page which is much larger than the portable device's window, is rendered onto a virtual display in memory by the browser 2 in the host computer 1, the color depth reduced for the entire image, but only the portion of the image of the web page 5 that would appear in the browser window 22 of the device 18 is captured, and the image digitally compressed for this portion and sent to the portable device 18.

In a further embodiment of the present invention, the entire web page which is much larger than the portable device's window, is rendered onto a virtual display in memory by the browser 2 in the host computer 1, the color depth reduced and the entire image digitally compressed, but only the portion of the image of the web page 5 that would appear in the browser window 22 of the device 18 is captured after the entire image is digitally compressed, and sent to the portable device 18.

In another embodiment of the present invention, the portion of the image of any web page that is captured and sent to the remote device is slightly larger than the browser window 22 of the device 18, instead of being the same size as the browser window 22, for all previous embodiments. Hence, the user may scroll around a little without a new area being sent from the host computer allowing the user to scroll slightly outside the display area. However, once the user scrolls outside the area that was captured, sent to the remote device and is presently displayed, the new area scrolled to is sent to the device which is again slightly larger than the browser window 22.

What is claimed is:

1. A system for viewing Internet content, the system comprising:
    a portable device; and
    a host computer coupled to the portable device through a communication link;
    wherein the host computer receives information defining a web page from outside and renders said information into an image of the web page in memory of the host computer in response to a request for the web page from the portable device, said information including text and graphics;
    wherein a software program running on the device implements a device browser window with icons which are fixed with respect to a device browser window;
    wherein the host computer reduces the color depth of a portion of the image of the web page which portion is proportional to the size of the device browser window, digitally compresses and transmits the portion of the image of the web page to the device, where the portion of the image of the web page is decompressed and stored into a display memory on the device for display; and wherein the portion of the image completely shows the content of the portion of the image which is always transmitted from the host computer when requested;
    wherein the device enables a user to scroll the image of the web page inside the device browser window and sends a message to the host computer informing the host computer scrolling operations occurred in the device browser; and
    wherein when apart of the image of the web page is brought into the device browser window but has not been sent to the device, the part of the image of the web page is sent from the host computer to the device.

2. A system as claimed in claim 1 wherein portions of the image of the web page scrolled into the device browser window for display are sent to the device from the host computer and stored collectively as a page on the device without common overlapping areas of the image being sent more than once from the host computer to the device during scrolling of the image in the device browser window.

3. A system as claimed in claim 1 wherein the image of the web page is stored on the host computer and also on a memory in the device along with information on which portions of the image have been sent to the device, enabling displaying the image of the web page from memory of the device without the same portions being sent again from the host computer to the device after displaying one or more different web pages.

4. A system as claimed in claim 1 wherein when the user clicks on a link to a new web page, image data of the current web page is compressed and stored on the device in a different memory location with information on links between web pages viewed, for view again by the user at a later time, whereby a portion of an image of the new web page rendered by the host computer is received flora the host computer by the device, decompressed and stored in the display memory.

5. A system as claimed in claim 1 wherein information about the last area displayed in the device browser window is stored in memory on the device for the web page, wherein upon returning to the web page, said last area displayed appears first in the device browser window.

6. A system as claimed in claim 1 wherein the host computer reduces the color depth of the entire web page before the portion of the image of the web page, which portion is equal in size to the device browser window, is digitally compressed and transmitted to the device.

7. A system as claimed in claim 1 wherein the host computer digitally compresses the image of the entire web page before the portion of the image of the web page, which portion is equal in size to the device browser window, is transmitted to the device.

8. A system as in claim 1 wherein:
    areas of each web page viewed are stored on the host computer and also on a memory in the device along with information on which areas of web pages were sent to the device such that when scrolling to a new area outside an area of a web page previously viewed, the device sends a message from the device to the host computer instructing the host computer to send this new area to the device which is then digitally compressed and transmitted to the device for display.

9. A system as in claim 1 wherein:
    web pages and corresponding areas frequently viewed by the user are stored on the host computer such that, when the address of a frequently viewed web page is entered on the device, the device sends a message containing the web page address to the host computer, which recognizes this frequently viewed web page and automatically sends corresponding areas frequently viewed to the device.

10. A method to view Internet content, the method comprising:
    sending from a device to a remote server a first request for a first web page;
    automatically receiving at the device from the remote server in a compressed format a first portion of a first image of the entire first web page wherein the first portion completely shows the content of that first portion of the first web page;
    displaying on a display of the device, at least a part of the first portion of the first image of the entire first web page;
    receiving, at the device, user input to display a second portion of the first image of the entire first web page;

transmitting, from the device to the remote server, data Indicating the user input to display the second portion of the first image of the entire first web page;

receiving at the device from the remote server in a compressed format the second portion of the first image of the entire first web page only when the second portion of the first image has not been transmitted from the remote server to the device:

displaying the second portion of the first image of the entire first web page on the display of the device;

wherein the first and second portions of the first image of the entire first web page are rendered at the remote server from information defining the first web page; and wherein at least one of the first and second portions of the first image is rendered at the remote server from information including text.

11. The method of claim 10, wherein the remote server retrieves the information defining the first web page from the Internet in response to the first request for the first web page.

12. The method of claim 10, wherein the user input to display the second portion of the first image of the entire first web page comprises input to scroll.

13. The method of claim 12, wherein the user input causes a visible part of the first portion being shown on the display of the device together with the second portion; and, the visible part of the first portion is displayed while the device is receiving the second portion from the remote server.

14. The method of claim 13, wherein before the second portion is received at the device, a predetermined color is display to represent the second portion of the image.

15. The method of claim 10, wherein the first portion is larger than an area on the display allocated for displaying the first web page.

16. The method of claim 10, wherein the first portion of the image is equal in size to a browser window which is allocated to display the first web page on the display of the device.

17. The method of claim 10, further comprising:
receiving at the device user input for a second web page;
storing the first and second portions of the first image of the first web page on the device in a compressed format;
sending from the device to the remote server a request for the second web page;
automatically receiving at the device from the remote server in a compressed format a portion of an image of the entire second web page; and
displaying, on the display of the device, at least a part of the portion of the image of the entire second web page.

18. The method of claim 17, further comprising;
receiving at the device user input to view the first web page after a pint of the image of the second web page is displayed on the display of the device;
storing the portion of the image of the second web page in a compressed format on the device; and
displaying a portion of the first image of the first web page according to the first and second portions of the first image of the first web page stored on the device.

19. The method of claim 17, further comprising;
receiving at the device user input to view the first web page after a part of the image of the second web page is displayed on the display of the device;
storing the portion of the image of the second web page in a compressed format in memory of the device; and
automatically displaying the second portion of the first image of the first web page.

20. The method of claim 19, wherein a last displayed portion of the first image of the first web page is automatically displayed in response to the user input to view the first web page.

21. The method of claim 10, further comprising;
sending from the device to the remote sewer a second request for the first web page; and
automatically receiving at the device from the remote server in a compressed format a third portion of a second image of the entire first web page; the third portion of the second image corresponding to the first and second portions of the first image of the first web page.

22. A method to serve Internet content, the method comprising:
receiving at a server from a remote device a first request for a first web page;
rendering a first portion of a first image of the entire first web page from information defining the first web page;
selectively transmitting from the server to the remote device in a compressed format the first portion of the first image of the entire first web page fir display on a display of the remote device wherein the first portion completely shows the content of that first portion of the first web page;
receiving, at the server from the remote device, data indicating user input to display a second portion of the firs: image of the entire first web page on the remote device;
rendering the second portion of the first image of the entire first web page from the information defining the first web page;
responsive to the data indicating the user input to display the second portion, transmitting from the server to the remote device in a compressed format the second portion of the first image of the entire first web page only when the second portion of the first image has not been transmitted from the server to the remote device;
wherein at least one of the first and second portions of the first image is rendered at the server from information including text.

23. The method of claim 22, wherein the server renders the entire first image of the entire first web page, including the first and second portions, in response to the first request for the first web page.

24. The method of claim 22, wherein the server retrieves the information defining the first web page from the Internet in response to the first request for the first web page.

25. The method of claim 22, wherein the user input to display the second portion of the first image of the entire first web page comprises input to scroll.

26. The method of claim 22, wherein the first portion is larger than an area on the display allocated for displaying the first web page.

27. The method of claim 22, wherein the first portion of the image is equal in size to a browser window which is allocated to display the first web page on the display of the remote device.

28. The method of claim 22, further comprising:
receiving at the server from the remote device a request for a second web page;
storing information about the first and second portions of the first image of the first web page at the server;
rendering at least a portion of an image of the entire second web page from information defining the second web page; and transmitting from the server to the remote device in a compressed format the portion of the image of the entire second web page for displaying on the display of the remote device.

29. The method of claim 28, further comprising:
receiving, at the server from the remote device, data indicating user input to display a third portion of the first image of the entire first web page on the remote device, after a part of the image of the second web page is transmitted for display on the remote device;
transmitting from the sewer to the remote device in a compressed format the third portion of the first image of the entire first web page only when the third portion of the first image has not been transmitted from the server to the remote device according to the information about the first and second portions of the first image of the first web page stored at the server.

30. The method of claim 22, further comprising:
receiving at the server from the remote device a second request for the first web page; and
retrieving refreshed information defining the first web page from the Internet in response to the second request;
rendering a third portion of a second image of the entire first web page from the refreshed information defining the first web page; and
automatically transmitting from the server to the remote device in a compressed format the third portion of the second image of the entire first web page, the third portion of the second image corresponding to the first and second portions of the first image of the first web page.

31. A device to view Internet content the device comprising:
means for sending to a remote server a first request for a first web page;
means for automatically receiving from the remote server in a compressed format a first portion of a first image of the entire first web page wherein the first portion completes shows the content of that first portion of the first web page;
means for displaying, on a display of the device, at least a part of the first portion of the first image of the entire first web page;
means for receiving user input to display a second portion of the first image of the entire first web page;
means for transmitting, from the device to the remote server, data indicating the user input to display the second portion of the first image of the entire first web page;
means for receiving from the remote server in a compressed format the second portion of the first image of the entire first web page only when the second portion of the first image has not been transmitted from the remote server to the device;
means for displaying the second portion of the first image of the entire first web page on the display of the device;
wherein the first and second portions of the first image of the entire first web page are rendered at the remote server from information defining the first web page; and
wherein at least one of the first and second portions of the first image is rendered at the remote server from information including text.

32. The device of claim 31, wherein the remote server retrieves the information defining the first web page from the Internet in response to the first request for the first web page.

33. The device of claim 31, wherein the user input to display the second portion of the first image of the entire first web page comprises input to scroll.

34. The device of claim 33, wherein the user input causes a visible part of the first portion being shown on the display of the device together with the second portion; and, the visible part of the first portion is displayed while the device is receiving the second portion from the remote server.

35. The device of claim 34, wherein before the second portion is received at the device, a predetermined color is display to represent the second portion of the image.

36. The device of claim 31, wherein the first portion is larger than an area on the display allocated for displaying the first web page.

37. The device of claim 31, wherein the first portion of the image is equal in size to a browser window which is allocated to display the first web page on the display of the device.

38. The device of claim 31 further comprising:
means for receiving user input for a second web page;
means for storing the first and second portions of the first image of the first web page on the device in a compressed format;
means for sending to the remote server a request for the second web page;
means for automatically receiving from the remote server in a compressed forms a portion of an image of the entire second web page; and
means for displaying, on the display of the device, at least a part of the portion of the image of the entire second web page.

39. The device of claim 38, further comprising;
means for receiving user input to view the first web page after a part of the image of the second web page is displayed on the display of the device;
means for storing the portion of the image of the second web page in a compressed format on the device; and
means for displaying a portion of the first image of the first web page according to the first and second portions of the first image of the first web page stored on the device.

40. The device of claim 38, further comprising:
means for receiving user input to view the first web page after a part of the image of the second web page is displayed on the display of the device;
means for storing the portion of the image of the second web page in a compressed format in memory of the device; and
means for automatically displaying the second portion of the first image of the first web page.

41. The device of claim 40, wherein a last displayed portion of the first image of the first web page is automatically displayed in response to the user input to view the first web page.

42. The device of claim 31, further comprising;
means for sending to the remote server a second request for the first web page; and
means for automatically receiving from the remote server in a compressed format a third portion of a second image of the entire first web page, the third portion of the second image corresponding to the first and second portions of the first image of the first web page.

43. A server to serve Internet content, the server comprising:
means for receiving from a remote device a first request for a first web page;

means for rendering a first portion of a first image of the entire first web page from information defining the first web page;

means for selectively transmitting to the remote device in a compressed format the first portion of the first image of the entire first web page for display on a display of the remote device wherein the first portion completely shows the content of that first portion of the first web page;

means for receiving, from the remote device, data indicating user input to display a second portion of the first image of the entire first web page on the remote device;

means for rendering the second portion of the first image of the entire first web page from the information defining the first web page;

means for transmitting responsive to the data indicating the user input to display the second portion, to the remote device in a compressed format the second portion of the first image of the entire first web page only when the second portion of the first image has not been transmitted from the server to the remote device;

wherein at least one of the first and second portions of the first image is rendered at the sewer from information including text.

44. The server of claim 43, wherein the server renders the entire first image of the entire first web page, including the first and second portions, in response to the first request for the first web page.

45. The server of claim 43, wherein the server retrieves the information defining the first web page from the Internet in response to the first request for the first web page.

46. The server of claim 43, wherein the user input to display the second portion of the first image of the entire first web page comprises input to scroll.

47. The server of claim 43, wherein the first portion is larger than an area on the display allocated for displaying the first web page.

48. The server of claim 43, wherein the first portion of the image is equal in size to a browser window which is allocated to display the first web page on the display of the remote device.

49. The server of claim 43, further comprising:
means for receiving from the remote device a request for second web page;
means for storing information about the first and second portions of the first image of the first web page;
means for rendering at least a portion of an image of the entire second web page from information defining the second web page; and
means for transmitting to the remote device in a compressed format the portion of the image of the entire second web page for displaying on the display of the remote device.

50. The server of claim 49, further comprising:
means for receiving, from the remote device, data indicating user input to display a third portion of the first image of the entire first web page on the remote device, after apart of the image of the second web page is transmitted for display on the remote device;
means for transmitting to the remote device in a compressed format the third portion of the first image of the entire first web page only when the third portion of the first image has not been transmitted from the serve to the remote device according to the information about the first and second portions of the first image of the first web page stored at the server.

51. The server of claim 43, further comprising:
means for receiving from the remote device a second request for the first web page; and
means for retrieving refreshed information defining the first web page from the Internet in response to the second request;
means for rendering a third portion of a second image of the entire first web page from the refreshed information defining the first web page; and
means for automatically transmitting from the server to the remote device in a compressed format the third portion of the second image of the entire first web page, the third portion of the second image corresponding to the first and second portions of the first image of the first web page.

52. A computer readable medium containing executable computer program instructions which when executed by a data processing system cause said system to perform a method to view Internet content, the method comprising:
sending from a device to a remote server a first request for a first web page;
automatically receiving at the device from the remote server in a compressed format a first portion of a first image of the entire first web page;
displaying, on a display of the device, at least a part of the first portion of the first image of the entire first web page wherein the first portion completely shows the content of that first portion of the first web page;
receiving, at the device, user input to display a second portion of the first image of the entire first web page;
transmitting, from the device to the remote server, data indicating the user input to display the second portion of the first image of the entire first web page;
receiving at the device from the remote server in a compressed format the second portion of the first image of the entire first web page only when the second portion of the first image has not been transmitted from the remote server to the device;
displaying the second portion of the first image of the entire first web page on the display of the device;
wherein the first and second portions of the first image of the entire first web page are rendered at the remote server from information defining the first web page; and
wherein at least one of the first and second portions of the first image is rendered at the remote server from information including text.

53. The medium of claim 52, wherein the remote server retrieves the information defining the first web page from the Internet in response to the first request for the first web page.

54. The medium of claim 52, wherein the user input to display the second portion of the first image of the entire first web page comprises input to scroll.

55. The medium of claim 54, wherein the user input causes a visible part of the first portion being shown on the display of the device together with the second portion; and, the visible part of the first portion is displayed while the device is receiving the second portion from the remote server.

56. The medium of claim 55, wherein before the second portion is received at the device, a predetermined color is display to represent the second portion of the image.

57. The medium of claim 52, wherein the first portion is larger than an area on the display allocated for displaying the first web page.

58. The medium of claim 52, wherein the first portion of the image is equal in size to a browser window which is allocated to display the first web page on the display of the device.

59. The medium of claim 52, wherein the method further comprises:
receiving at the device user input for a second web page;
storing the first and second portions of the first image of the first web page on the device in a compressed format;
sending from the device to the remote server a request for second web page;
automatically receiving at the device from the remote server in a compressed format a portion of an image of the entire second web page; and
displaying, on the display of the device, at least a part of the portion of the image of the entire second web page.

60. The medium of claim 59, wherein the method further comprises:
receiving at the device user input to view the first web page after a part of the image of the second web page is displayed on the display of the device;
storing the portion of the image of the second web page in a compressed format on the device; and
displaying a portion of the first image of the first web page according to the first and second portions of the first image of the first web page stored on the device.

61. The medium of claim 59, wherein the method further comprises:
receiving at the device user input to view the first web page after a part of the image of the second web page is displayed on the display of the device;
storing the portion of the image of the second web page in a compressed format in memory of the device; and
automatically displaying the second portion of the first image of the first web page.

62. The medium of claim 61, wherein a last displayed portion of the first image of the first web page is automatically displayed in response to the user input to view the first web page.

63. The medium of claim 52, wherein the method further comprises:
sending from the device to the remote sever a second request for the first web page; and
automatically receiving at the device from the remote server in a compressed format a third portion of a second image of the entire first web page, the third portion of the second image corresponding to the first and second portions of the first Image of the first web page.

64. A computer readable medium containing executable computer program instructions which when executed by a data processing system cause said system to perform a method to serve Internet content, the method comprising:
receiving at a server from a remote device a first request for a tint web page;
rendering a first portion of a first image of the entire first web page from information defining the first web page;
selectively transmitting from the server to the remote device in a compressed format the first portion of the first image of the entire first web page for display on a display of the remote device wherein the first portion completely shows the content of that first portion of the first web page;
receiving, at the server from the remote device, data indicating user input to display a second portion of the first image of the entire first web page on the remote device;
rendering the second portion of the first image of the entire first web page from the information defining the first web page;
responsive to the data indicating the user input to display the second portion transmitting from the server to the remote device in a compressed format the second portion of the first image of the entire first web page only when the second portion of the first image has not been transmitted from the server to the remote device;
wherein at least one of the first and second portions of the first image is rendered at the server from information including text.

65. The medium of claim 64, wherein the sewer renders the entire first image of the entire first web page, including the first and second portions, in response to the first request for the lint web page.

66. The medium of claim 64, wherein the server retrieves the information defining the first web page from the Internet in response to the first request for the first web page.

67. The medium of claim 64, wherein the user input to display the second portion of the first image of the entire first web page comprises input to scroll.

68. The medium of claim 64, wherein the first portion is larger than an area on the display allocated for displaying the first web page.

69. The medium of claim 64, wherein the first portion of the image is equal in size to a browser window which is allocated to display the first web page on the display of the remote device.

70. The medium of claim 64, wherein the method further comprises:
receiving at the server from the remote device a request for a second web page;
storing information about the first and second portions of the first image of the first web page at the server;
rendering at least a portion of an image of the entire second web page from information defining the second web page; and
transmitting from the server to the remote device in a compressed format the portion of the image of the entire second web page for displaying on the display of the remote device.

71. The medium of claim 70, wherein the method further comprises:
receiving, at the server from the remote device, data indicating user input to display a third portion of the first image of the entire first web page on the remote device, after a part of the image of the second web page is transmitted for display on the remote device;
transmitting from the server to the remote device in a compressed format the third portion of the first image of the entire first web page only when the third portion of the first image has not been transmitted from the server to the remote device according to the information about the first and second portions of the first image of the first web page stored at the server.

72. The medium of claim 64, wherein the method further comprises:
receiving at the server from the remote device a second request for the first web page; and
retrieving refreshed information defining the first web page from the Internet in response to the second request;

rendering a third portion of a second image of the entire first web page from the refreshed information defining the first web page; and automatically transmitting from the server to the remote device in a compressed format the third portion of the second image of the entire first web page, the third portion of the second image corresponding to the first and second portions of the first image of the first web page.

73. A method to view Internet content, the method comprising:

sending from a device to a remote server a request for a web page;

receiving at the device from the remote server iii a compressed format at lean a portion of an image of the entire web page, the portion of the image being rendered at the remote server from information including text;

selectively displaying the portion of the image on a display of the device according to a user input to the device; and automatically displaying the portion of the image on the display of the device in response to a user Input to return to the web page wherein the portion completely shows the content of that portion of the web page.

74. The method of claim 73, wherein the user input to return to the web page comprises a selection of a back icon displayed on the display of the device.

75. The method of claim 73, wherein the portion of the image comprises an area of the image last displayed for the web page before the user input to return to the web page.

76. The method of claim 73, further comprising:

receiving at the device from the remote server a plurality of portions of the image of the entire web page;

storing on the device the plurality of portions of the image; and scrolling the plurality of portions of the image on the device according to the plurality of portions of the image stored on the device.

77. The method of claim 73, further comprising storing on the device the portion of the image;

wherein the portion of the image is displayed on the display of the device using the portion of the image stored on the device in response to the user input to return to the web page.

78. A method to serve Internet content, to method comprising:

storing on a server information about a plurality of frequently visited locations of a web page for a remote device, the plurality of frequently visited locations being identified through user inputs to the remote device;

receiving at the server from the remote device a request for the web page;

rendering at least a portion of an image of the entire web page from information defining the web page, the portion of the image including the plurality of frequently visited locations;

transmitting in a compressed format the portion of the image from the server to the remote device in response to the request for the web page wherein the portion completely shows the content of that portion of the web page.

79. The method of claim 78, wherein the user inputs comprise inputs to scroll to locations of the web page for display on the remote device.

80. The method of claim 78, wherein a portion of the image which does not contain the plurality of frequently visited locations is not transmitted to the remote device in response to the request for the web page.

81. The method of claim 78, wherein the information defining the web page is retrieved from the Internet in response to the request for the web page.

82. The method of claim 81, wherein the portion of the image is rendered from information including text.

83. A device to view Internet content, the device comprising;

means for sending to a remote server a request for a web page;

means for receiving from the remote server in a compressed format at least a portion of an image of the entire web page, the portion of the image being rendered at the remote server from information including text;

means fur selectively displaying the portion of the image on a display of the device according to a user input to the device; and means for automatically displaying the portion of the image on the display of the device in response to a user input to return to the web page wherein the portion completely shows the content of that portion of the web page.

84. The device of claim 83, wherein the user input to return to the web page comprises a selection of a back icon displayed on the display of the device.

85. The device of claim 83, wherein the portion of the image comprises an area of the image last displayed for the web page before the user input to return to the web page.

86. The device of claim 83, further comprising:

means for receiving from the remote server a plurality of portions of the image of the entire web page;

means for storing the plurality of portions of the image; and means for scrolling the plurality of portions of the image on the device according to the plurality of portions of the image stored on the device.

87. The device of claim 83, further comprising:

means for storing on the device the portion of the image;

wherein the portion of the image is displayed on the display of the device using the portion of the image stored on the device in response to the user input to return to the web page.

88. A server to serve Internet content the server comprising:

means for storing information about a plurality of frequently visited locations of a web page for a remote device, the plurality of frequently visited locations being identified through user inputs to the remote device;

means for receiving from the remote device a request for the web page;

means for rendering at least a portion of an image of the entire web page from information defining the web page, the portion of the image including the plurality of frequently visited locations;

means for transmitting in a compressed format the portion of the image from the server to the remote device in response to the request for the web page wherein the portion completely shows the content of that portion of the web page.

89. The server of claim 88, wherein the user inputs comprise inputs to scroll to locations of the web page for display on the remote device.

90. The server of claim 88, wherein a portion of the image which does not contain the plurality of frequently visited locations is not transmitted to the remote device in response to the request for the web page.

91. The server of claim 88, wherein the information defining the web page is retrieved from the Internet in response to the request for the web page.

92. The server of claim 91, wherein the portion of the image is rendered from information including text.

93. A computer readable medium containing executable computer program instructions which when executed by a data processing system cause said system to perform a method to view Internet content the method comprising:

sending from a device to a remote server a request for a web page;

receiving at the device from the remote server in a compressed format at least a portion of an image of the entire web page, the portion of the image being rendered at the remote server from information including text;

selectively displaying the portion of the image on a display of the device according to a user input to the device: and automatically displaying the portion of the image on the display of the device in response to a user input to return to the web page wherein the portion completely shows the content of that portion of the web page.

94. The medium of claim 93, wherein the user input to return to the web page comprises a selection of a back icon displayed on the display of the device.

95. The medium of claim 93, wherein the portion of the image comprises an area of the image last displayed for the web page before the user input to return to the web page.

96. The medium of claim 93, wherein the method further comprises:

receiving at the device from the remote server a plurality of portions of the image of the entire web page;

storing on the device the plurality of portions of the image; and scrolling the plurality of portions of the image on the device according to the plurality of portions of the image stored on the device.

97. The medium of claim 93, wherein the method further comprises:

storing on the device the portion of the image;

wherein the portion of the image is displayed on the display of the device using the portion of the Image stored on the device in response to the user input to return to the web page.

98. A computer readable medium containing executable computer program instructions which when executed by a data processing system cause said system to perform a method to serve Internet content, the method comprising:

storing on a server information about a plurality of frequently visited locations of a web page for a remote device, the plurality of frequently visited locations being identified through user inputs to the remote device;

receiving at the server from the remote device a request for the web page;

rendering at least a portion of an image of the entire web page from information defining the web page, the portion of the image including the plurality of frequently visited locations;

transmitting in a compressed format the portion of the image from the server to the remote device in response to the request for the web page wherein the portion completely shows the content of that portion of the web page.

99. The medium of claim 98, wherein the user inputs comprise inputs to scroll to locations of the web page for display on the remote device.

100. The medium of claim 98, wherein a portion of the image which does not contain the plurality of frequently visited locations is not transmitted to the remote device in response to the request for the web page.

101. The medium of claim 98, wherein the information defining the web page is retrieved from the Internet in response to the request for the web page.

102. The medium of claim 101, wherein the portion of the image is rendered from information Including text.

* * * * *